United States Patent

[11] 3,617,301

| [72] | Inventors | Donald Barby<br>Great Barrow, Chester;<br>James P. Quinn, Warrington, both of England |
|---|---|---|
| [21] | Appl. No. | 723,576 |
| [22] | Filed | Apr. 23, 1968 |
| [45] | Patented | Nov. 2, 1971 |
| [73] | Assignee | Joseph Crosfield and Sons Limited<br>Warrington, England |
| [32] | Priority | Apr. 28, 1967 |
| [33] | | Great Britain |
| [31] | | 19783/67 |

[54] STABILIZATION OF BEER
6 Claims, No Drawings

[52] U.S. Cl..................................................... 99/48

[51] Int. Cl...................................................... C12h 1/04
[50] Field of Search........................................... 99/31, 48

[56] References Cited
UNITED STATES PATENTS

| 2,316,241 | 4/1943 | Heimann...................... | 99/48 |
|---|---|---|---|
| 3,436,225 | 4/1969 | Raible........................... | 99/48 |

*Primary Examiner* — Lionel M. Shapiro
*Assistant Examiner* — D. M. Naff
*Attorney* — Louis F. Kline, Jr.

ABSTRACT: A process for the treatment of beer to reduce its tendency to form haze on storage and to maintain or improve its head or foam retention characteristics in which the beer is treated with a silica hydrogel having a surface area of at least 700 m.$^2$/g. and a mean pore diameter from 30–120A.

STABILIZATION OF BEER

This invention relates to a process for the treatment of beer and more particularly to a process for improving beer by reducing its tendency to form haze on storage.

The term "beer" in this specification is to be constructed in the broad sense to include beverages such as ales, lagers and stouts and other liquids which present haze problems on storage.

Various processes have been proposed hitherto for clarifying beer by the removal of the various haze forming constituents. The haze or turbidity present in beer can sometimes be removed by filtration techniques but in some beers, on standing, a further haze or turbidity develops and, if the beer has by this time been bottled or canned, removal is generally not practicable. It is therefore desirable to remove both the haze developed during production or on standing prior to final processing and also haze forming materials which will develop haze during the time the beer is standing after the final processing but before being consumed. It is desirable that the materials used for treating the beer do not remove from the beer components which are essential to the character of the beer such as flavor forming components, head-forming components and colorings.

Various materials such as bentonites, active carbon, nylon, polyvinyl pyrrolidone and certain silicas have previously been proposed for this purpose and are to a greater or lesser extent effective. However, the cost of such treatment arising both from the materials used and from processing costs such as filtration and storage are not insignificant and any reduction, particularly when under some circumstances this can be accompanied by increased efficiency, and without a reduction in desirable characteristics such as flavor and head-retention is attractive. In addition, some food purity laws require that no soluble materials be added to beverages.

It has now been found that certain high surface area silica hydrogels, having a fairly closely defined means pore diameter (MPD), give good results in respect of haze removal and, have no ill-effect on head retention and, in some cases, even improve this particular characteristic of the beer.

Accordingly, the present invention provides a process for the treatment of beer which comprises mixing with the beer a silica hydrogel having a surface area of at least 700 m.$^2$/g. and a mean pore diameter from 30 to 120A and separating the silica from the beer.

The definition of a silica hydrogel as given in the literature is not always clear and silica xerogels and silica hydrogels have many similar features. However, in this specification and claims these two types of silica gel are clearly distinguished as follows. A silica xerogel is considered to be a three-dimensional network of ultimate particles of polysilicic acid the size and packing of which determine the surface area and pore volume. Furthermore polymerization of the polysilicic acid can be induced with the aid of an aqueous phase but this results only in the solution of the polysilicic acid and subsequent redeposition to produce larger particles. This is evidenced by the fact that the degree of packing or total pore volume remains unchanged while the surface area is diminished. In the hydrogel state the polysilicic acid polymer exists as a semirigid mass. There exists a continuous water phase which promotes further growth by polymerization and changes in packing density. The extent of the growth and changes depends upon time, pH and temperature hence the hydrogel is a dynamic system and remains as such until the shrinkage forces introduced by the partial removal of the aqueous phase lead to the irreversible production of a xerogel "pore" system. It will therefore be appreciated that xerogel and hydrogel can readily be distinguished by the fact that pore volume as well as surface area change on the hydrothermal treatment of hydrogel hence the hydrogel is in a metastable state and the xerogel is in a stable form.

Hitherto in considering hydrogels in connection with surface area and pore volume, these characteristics have been defined in terms of the xerogel derived from the hydrogel in question, but methods used previously on xerogels have now been applied to hydrogels so that the surface area, pore volume and mean pore diameter can be deduced directly from a hydrogel. The pore volume (P.V.) of a silica hydrogel within limits is related to the water content of the gel. A sample of the hydrogel is weighed into a container which is then connected to a vacuum pump. When the pressure has dropped considerably (to about 0.1 mm. mercury) and most of the water has been removed, heating is started and the surface area of the sample determined using a conventional adsorbtion technique. After this, the sample is reweighed to find the actual weight of silica employed and the appropriate pore volume is calculated from:

$$P.V. = \frac{\text{percent water}}{100 - \text{percent water}} \text{cc./g.}$$

The mean pore diameter (MPD) is calculated from:

$$M.P.D. = \frac{4W \times 10^4}{S(100-W)} \text{Å}.$$

where W is weight percent water in hydrogel and S is surface area of hydrogel, m.$^2$/g.SiO$_2$.

One accepted indication of the haze reducing or stabilizing efficiency of silicas used in the treatment of beers is the "saturated ammonium sulfate precipitation limit" test. In this test saturated ammonium sulfate solution is added to samples of treated and untreated beer and the quantity of solution required to cause a sudden increase in turbidity as measured by a reflectometer, is measured. The difference in quantity required by the treated and untreated beer, often expressed as Δml. SASPL, is an indication of the haze reducing efficiency of the silica under test.

The head retention values (HRV) referred to in the present specification were determined by the following test.

Samples of beer were treated at 0° C. with a sample of silica (1 g. as SiO$_2$ per litre) and left standing for 5 minutes or 24 hours. Then the silica was filtered off. The treated beer was carefully run into a tube to a height of 10 cm., the tube having at its lower end a sintered glass disc through which carbon dioxide gas can be bubbled into the beer to form a head of foam. Bubbling is continued to a predetermined height (32.5 cm.) and then the gas supply is reduced to just support the beer on the disc whereupon the foam starts to collapse. The head retention value is 1.44 multiplied by the time in seconds taken for the boundary between the level of the liquid beer and the bottom surface of the foam to pass between marks at 5 and 7.5 cm. on the tube.

While we do not wish in any way to be bound by the following theories these theories do offer a possible explanation of the way in which the process of the present invention works.

It appears to be possible that the stability of foam on beer "head") is dependent on a positive or boosting and negative or suppressing head factor and that these two factors are constituted by materials of significantly different particle size or shape. Hence by selecting silica hydrogel having a closely defined MPD the negative factor can perhaps be preferentially or selectively removed.

Accordingly in a preferred embodiment of this invention the mean pore diameter of the silica hydrogel is from 40 to 80 A.

It will be understood that the MPD is an average figure and can be the result of a wide or narrow actual distribution of pore widths and the preferred silicas for use in this invention have a wide distribution of pore widths and not a relatively narrow one as has been the case with hitherto proposed high pore volume xerogels and with certain precipitated silicas to which have been ascribed "mean pore diameters."

For efficient operation of the process of this invention and particularly to produce the best results in respect of contact time of beer and silica and ease of separation of beer from the silica it is desirable that a significant proportion of the silica is present as fine particles. The average particle size of the silica is preferably less than 20 microns.

As with the MPD discussed above, the actual particles on which the average figure is based can be made up in various ways and for the process of this invention it is desirable that at least 10 percent by weight of the silica is made up of particles smaller than 10 microns. While it will be appreciated that the accurate assessment of particle size is difficult when the particles are less than about 3 microns the following table I indicates that for good Δml. SASPL figures a significant number of particles less than 5 microns is desirable.

TABLE I

| %<5μ | SASPL(Δ ml.) |
|---|---|
| 38.4 | 2.2 |
| 9.9 | 2.0 |
| 7.7 | 1.7 |
| 0.4 | 1.6 |
| 0.1 | 1.2 |

Accordingly silica hydrogels having at least 10 percent of their particles less than 5 microns are particularly useful.

The quantity of silica used in the treatment of beer will be to an extent dependent on the actual hydrogel selected and to the quality and age of the beer to be treated.

In general using the above defined silica hydrogel it will not normally be necessary to use more than 1 g. of silica per litre of beer to be treated.

In a further preferred form of the invention the pH of a hydrogel dispersion, containing at least 5 percent by weight of silica, is in the region of the isoelectric point of the silica that is to say having a pH about 2. Hydrogels having a pH between 2 and 1.5 show outstandingly good characteristics when judged by the Δml. SASPL and their stability.

The hydrogel for use in this invention may be used in the form of a slurry although the powder form is preferred.

The hydrogels useful in the present invention may be prepared by known techniques. A common method of preparation involves the addition of sulfuric acid 1.33 specific gravity (SG) to sodium silicate (3.3:1 $SiO_2:Na_2O$ and 1.315 SG) and can conveniently be carried out in a jet mixer. The sol produced is allowed to form a gel structure at a pH of 0.22 and synerize in a suitable container for a period of up to 6 hours. The gel is then broken into small pieces and washed with water at a pH of about 4 to remove a substantial proportion of the electrolyte, the washing period can be up to 15 hours. The pieces of gel are then washed and milled to produce hydrogel 32 for use in this invention.

A sample of this hydrogel 32 was air-dried to provide hydrogel 40 and a sample of this material further air-dried to provide hydrogel 48. A sample of hydrogel 48 was then oven-dried to provide xerogel A and as is well-known, such a drying step causes the pores to close to a significant extent.

Table II shows the various characteristics of hydrogels 32, 40 and 48 and of xerogel A. In addition xerogels B and C have been tested for comparative purposes.

The tests of stabilizing efficiency Δml SASPL and head retention value were those described earlier and were applied to a normal pale ale as normally cold as a bottled beer.

TABLE II

| Silica | Surface area [1] ($N_2$), m.²/g. | Water content, percent | Mean pore dia., A. | Particle size Percent >40μ | Particle size Percent <10μ | APSμ | Stabilising efficiency SASPL ml. (5 mins.) | Stabilising efficiency Δml. SASPL | Head retention values (secs.) HRV 5 mins. | Head retention values (secs.) Δsecs. |
|---|---|---|---|---|---|---|---|---|---|---|
| 1 g./litre: | | | | | | | | | | |
| Control | | | | | | | 1.2 | | 141.1 | |
| Xerogel A | 984 | 8 | 24 | 0 | 16.5 | 15.0 | 1.8 | 0.6 | 152.9 | +11.8 |
| Hydrogel 48 | 1,011 | 52 | 43 | 0 | 16.0 | 15.0 | 2.9 | 1.7 | 144.4 | +3.3 |
| Hydrogel 40 | 1,033 | 60 | 58 | 1.1 | 15.9 | 15.3 | 3.2 | 2.0 | 145.3 | +4.2 |
| Hydrogel 32 | 1,006 | 68 | 84 | 4.7 | 14.6 | 16.4 | 3.2 | 2.0 | 144.3 | +3.2 |
| Xerogel B | 360 | 0 | 103 | 3.5 | 11.6 | 23.4 | 3.1 | 1.9 | 144.6 | +3.5 |
| Xerogel C | 360 | 0 | 103 | 0 | 32 | 12 | 3.4 | 2.2 | 131 | −10.1 |
| 10 g./litre: | | | | | | | | | | |
| Hydrogel 32 | 1,006 | 68 | 84 | 4.7 | 14.6 | 16.4 | | | 123.0 | −18.1 |
| Xerogel B | 360 | 0 | 103 | 3.5 | 11.6 | 23.4 | | | 92.2 | −48.9 |

[1] Surface areas determined by the "One point method."

What is claimed is:

1. A process for the treatment of beer which comprises mixing with the beer a clarifying amount of a silica hydrogel having a surface area of at least 700 m.²/g. and a mean pore diameter from 30 to 120 A and separating the silica from the beer.

2. A process as claimed in claim 1, in which the mean pore diameter of the silica is from 40 to 80 A.

3. A process as claimed in claim 2, in which the average particle size of the silica is less than 20 microns.

4. A process as claimed in claim 3, in which at least 10 percent by weight of the hydrogel is made up of particles smaller than 10 microns.

5. A process as claimed in claim 4, in which at least 10 percent by weight of the hydrogel is made up of particles smaller than 5 microns.

6. A process as claimed in claim 1 in which the distribution of pore sizes on which the mean pore diameter is based is a wide one.